United States Patent [19]

Vives et al.

[11] Patent Number: 5,034,172
[45] Date of Patent: Jul. 23, 1991

[54] PROCESS FOR THE MANUFACTURE OF COMPOSITE COMPONENTS COMPRISING A WEB AND A REINFORCEMENT STRUCTURE

[75] Inventors: Michel Vives, Eysines; Eric Pestourie, Merignac, both of France

[73] Assignee: Societe Europeenne de Propulsion, Suresnes, France

[21] Appl. No.: 420,051

[22] Filed: Oct. 11, 1989

[30] Foreign Application Priority Data

Oct. 14, 1988 [FR] France .................. 88 13590

[51] Int. Cl.$^5$ .................. B29C 39/10; B29C 41/20; B29C 43/18
[52] U.S. Cl. .................. 264/81; 264/136; 264/257; 427/249; 427/255
[58] Field of Search .............. 264/258, 257, 129, 319; 264/134, 135, 136, 137, 81, 44; 427/249, 255

[56] References Cited

U.S. PATENT DOCUMENTS

| | | | |
|---|---|---|---|
| 1,947,695 | 2/1934 | Carthew | 264/319 |
| 2,781,552 | 2/1957 | Gray | 264/319 |
| 4,201,611 | 5/1980 | Stover | 156/155 |
| 4,637,550 | 1/1987 | Nash | 239/265.37 |

FOREIGN PATENT DOCUMENTS

| | | |
|---|---|---|
| 0033638 | 8/1981 | European Pat. Off. |
| 0100697 | 2/1984 | European Pat. Off. |
| 0214113 | 3/1987 | European Pat. Off. |
| 2401888 | 3/1979 | France |
| 2112699 | 7/1983 | United Kingdom |
| 2159460 | 12/1985 | United Kingdom |

Primary Examiner—Jay H. Woo
Assistant Examiner—Jeremiah F. Durkin
Attorney, Agent, or Firm—Weingarten, Schurgin, Gagnebin & Hayes

[57] ABSTRACT

A process relating to the manufacture of a composite component comprising a web and a reinforcement structure. The process includes providing a profiled section constituting a fibrous structure that is rigidified by impregnation with a thermoformable binder. The profiled section provided has a cross-section corresponding to the dimensions of a non-compacted blank of the component to be formed in a single unit with the web and the reinforcement structure. A blank of the component to be produced is machined from a length of the profiled section. The blank is press formed to obtain a preform having a shape and dimensions approximating those of the component to be produced and the preform is densified by chemical vapor infiltration of a material constituting a matrix within the fibrous structure, after elimination of the thermoformable binder.

2 Claims, 3 Drawing Sheets

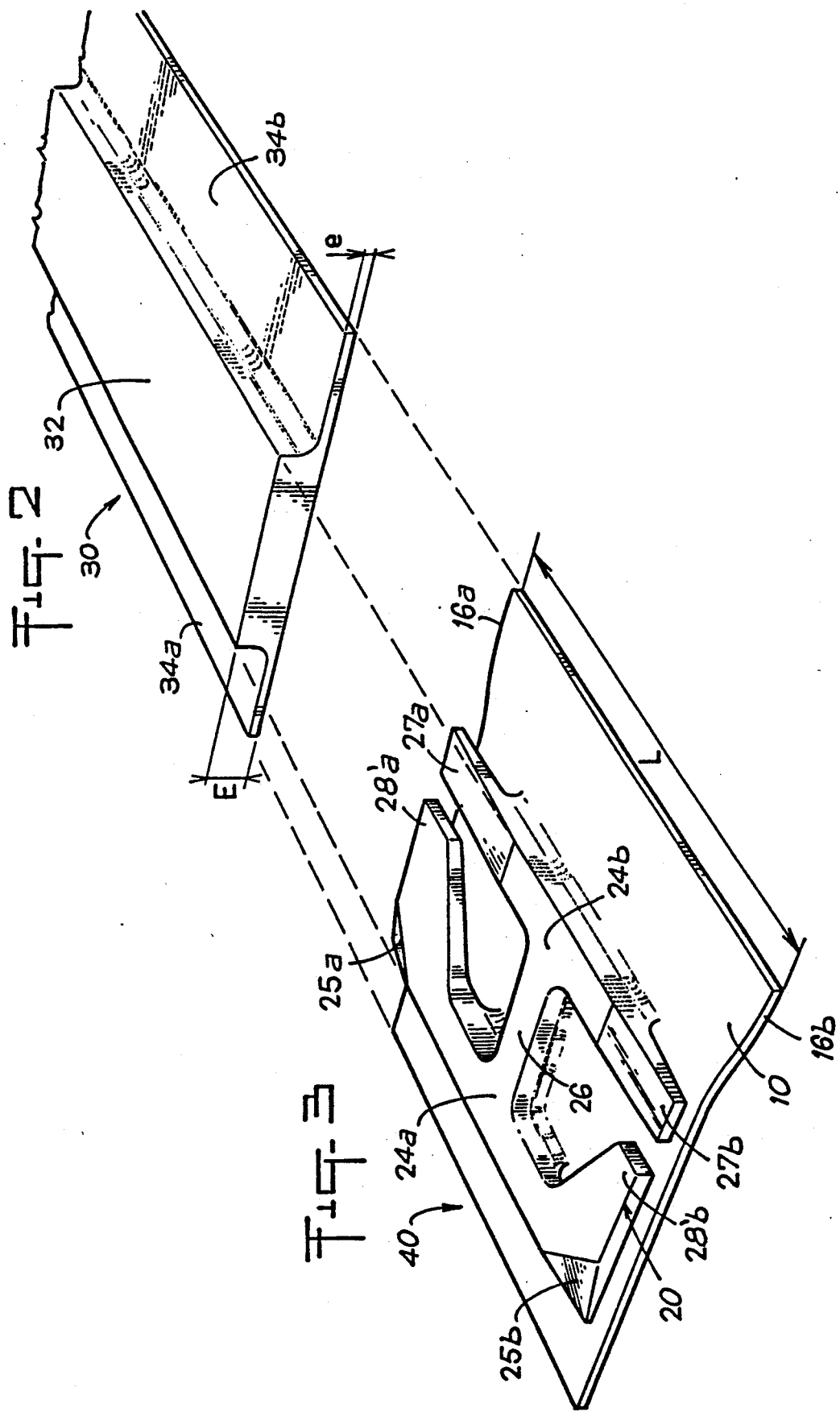

PROCESS FOR THE MANUFACTURE OF COMPOSITE COMPONENTS COMPRISING A WEB AND A REINFORCEMENT STRUCTURE

BACKGROUND OF THE INVENTION

1. Field of the invention

The present invention relates to the manufacture of composite components comprising a web and a reinforcement structure. More particularly, the invention relates to a process for the manufacture of composite material components comprising a rigid web, such as a sheet or thin plate having a specific shape, provided on at least one of its faces with a reinforcement structure that is unitary with the web and designed to provide the components with the stiffness and mechanical properties required for their use.

One particular application of the invention is in the manufacture of composite internal flaps of turbojet nozzles, such flaps comprising a web having a reinforcement structure, which can he "H" shaped, on one of their faces.

A composite material component is made from a fibrous texture that is densified by a matrix. The materials constituting the fibrous texture and the matrix are selected as a function of the component's conditions of use. With composite components that are exposed to high thermo-mechanical stresses, such as in the case of internal flaps for turbojet nozzles, the materials used are typically made from a carbon or silicon carbidefibrous texture in combination with a carbon or ceramic matrix, usually made of silicon carbide.

2. Prior art

One known method for manufacturing a component having a complex shape consists in making preforms of constituent parts of the component having simple shapes, and then assembling the preforms, e.g. by molding with a themoformable resin, to produce a preform of the final component, and finally densifying the thus-obtained preform with matrix material, as the thermoformable resin is eliminated.

This known method has been implemented by the applicant for the manufacture of flaps for turbojet nozzles, of the type shown in figure . The preform of the web is made by piling layers of a bidimensional fibrous texture, such as a fabric. The preform for the reinforcement structure 2 is made by piling layers of a bidimensional fibrous texture to form a plate, fixing the shape of the plate by impregnation with thermoformable resin and machining an "H" shaped reinforcement from the plate whose shape has thus been fixed. The preforms for the web and reinforcement structure are assembled in a mold to obtain a preform for a flap by molding with a thermoformable resin. During the molding operation, the web is conformed as shown in FIG. 1, so as to obtain the desired relief, produce ear or leg elements 3 , and draw the web and reinforcement structure into perfect mutual contact. The densification of the preform for the flap, which is held inside a tool, is achieved by vapor-phase infiltration of matrix material, e.g. silicon carbide within the fibrous texture, the thermoformable resin e.g. being eliminated during the temperature rise preceding the infiltration of the matrix. During assembly, the flap is affixed to the end of an actuator that conveys the desired movements to the flap, as well as to two adjacent flaps that press against the legs 3.

It appeared that this method could have some drawbacks. For instance, it turned out that the web could separate from the reinforced structure when the flap was in use. Besides, the complexity of the molds makes this method expensive and ill adapted to series production.

It is therefore an object of the present invention to provide a process for producing composite components, comprising a web and a reinforcement structure, that is free of the above-mentioned risk of separation between the web and reinforcement, while offering a reduced manufacturing cost in series production.

SUMMARY OF THE INVENTION

The above object is achieved through a process which, according to the invention, comprises the steps of:

providing a profiled section from a fibrous structure that is rigidified by impregnation with a thermoformable binder, said profiled section having a cross section corresponding to the dimensions of a non-compacted blank of said component to be formed, with said web and said reinforcement member in a single unit.

machining a blank of said component to be produced from a length of said profiled section ;

press forming said blank so as to obtain a preform having a shape and dimensions approximating those of the component to be produced ; and densifying said preform by chemical vapor infiltration of a material that is a constituent of a matrix within said fibrous texture, after elimination of said thermoformable binder.

Because an initial profiled section is used, it is possible to produce a component blank directly by machining a length of the profiled section, rather than by making separate blanks for the web and the reinforcement structure and subsequently assembling them by molding with a thermoformable resin. As a result, the interface between the web and the reinforcement structure no longer defines a zone of weakened cohesion, and hence the risk of separation between the web and the reinforcement is reduced. Moreover, there is no longer need to employ relatively complex molds.

Advantageously, the profiled section is a three-dimensisonal fibrous structure, e.g. a woven three-dimensional structure, or a structure formed by piling layers of a two-dimensional structure, with the layers interconnected by needling or implantation of yarns perpendicular thereto. This eliminates the risk of delamination (separation in the plane of a layer) which could be observed in structures made by merely piling two-dimensional textures when implementing the above-mentioned prior-art process, and more particularly during dismantling of the densification tool.

The composite component is also advantageously provided with anti-oxidation protection, especially if exposed to relatively high temperatures in an oxidizing medium when in use.

BRIEF DESCRIPTION OF THE DRAWINGS

Other specific characteristics and advantages of the process according to the invention shall be understood from the following description, given as a non-limiting example with reference to the accompanying drawings in which :

FIGS. 2 to 4 illustrate three successive stages in the manufacture of a flap for a turbojet nozzle made of a composite material employing a process according to the invention.

DETAILED DESCRIPTION OF PREFERRED EMBODIMENTS

A specific method for carrying out the invention shall be described hereafter as applied to the manufacture of flaps at the afterburn port of a turbojet nozzle. But it should be borne in mind that the inventive process is more generally applicable to the manufacture of any component having a web part in combination with a reinforcement part that is unitary with the web part.

Figure 1:
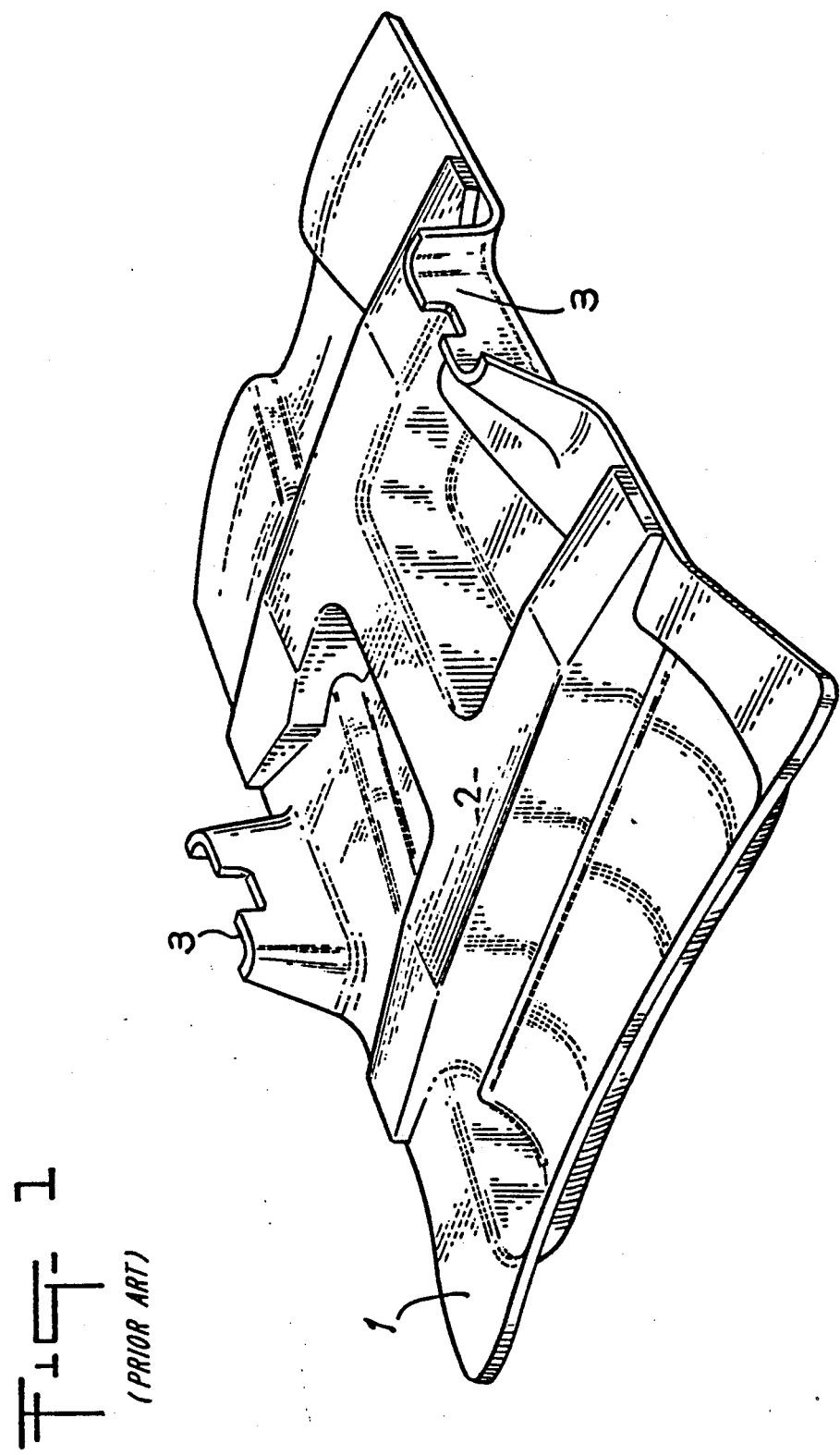
FIG. 1, already cited, depicts a flap for a turbojet nozzle made of a composite material of the type produced by implementing a process whose principle is known.
Figure 4:
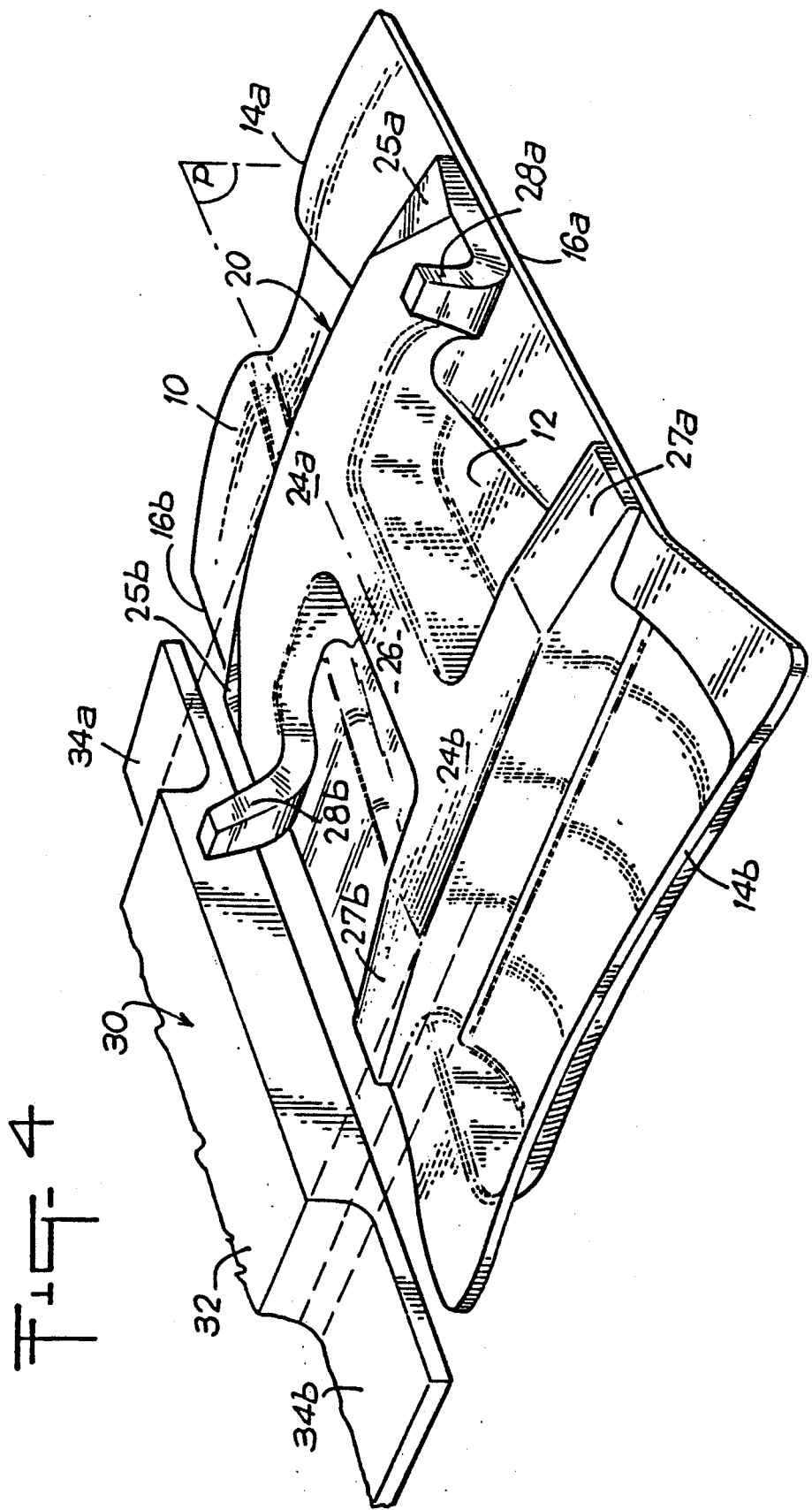

Referring first of all to FIG. 4, which depicts a flap such as obtained by the inventive process, it can be seen that the flap has a general shape similar to the flap of figure 1 and comprises a web 10, on one face of which is formed a reinforcement structure 20 that is unitary with the web.

The web 10 consists of a relatively thin rigid sheet whose general shape is substantially rectangular. At a mid portion in a longitudinal direction (defined here as a direction parallel to the flap's symmetry plane P), the web defines a depression 12 that broadens out as it extends from one edge 14a of the flap up to the opposite edge 14b, parallel to edge 14a. At its end located along edge 14b, the depression 12 is limited by the edge of the web that closes the end of the depression, while depression 12 is open at its other end along edge 14a. The other opposite sides 16a, 16b of the web 10 are mutually parallel throughout their length from edge 14a, except for the end portion close to edge 14b where sides 16a, 16b spread apart, with the web 10 therefore widening at this terminal portion up to edge 14b.

The reinforcement structure is generally "H" shaped with two transversal ribs 24a, 24b located at substantially equal distances from edges 14a and 14b, and extending throughout the length of the web 10, plus a longitudinal middle rib 26 that links together the central parts of the two ribs 24a, 24b. Rib 24a is prolonged at either end by fingers 28a, 28b directed towards the opposite rib 24b and curved towards the top, i.e. away from the web 10. The fingers 28a, 28b are intended to provide a link between the flap and adjacent flaps during their assembly.

Apart from the end portions of the ribs 24a, 24b, the upper surface of the reinforcement structure 20 is substantially planar and parallel to the web 10. At the two end portions of rib 24a, a bevel is formed at the angle opposite that from which the finger 28a, 28b protrudes. Bevels 27a, 27b are also formed at the end portions of rib 24b, the latter therefore thinning out at its ends.

It shall be noted that the inner face of the reinforcement structure 20 conforms exactly with the profile of the web 10, the reinforcement and web being in intimate contact.

According to the invention, the flap is made from a profiled section 30 such as shown in FIG. 2. The profiled section 30 consists of a fibrous structure that is rigidified by impregnation using a thermoformable resin.

In cross-section, the profiled section 30 has a shape corresponding to the dimension of a non-compacted blank of the flap to be made. As shown in FIG. 2, the profiled section 30 has a central portion of constant thickness E, prolonged on either side by two wings 34a, 34b of constant thickness e, less than that of the central portion. As will be understood from the remainder of the description, the thickness e is chosen such that, after compacting and shaping, the wings 34a, 34b can form the part of the web 30 located on either side of the reinforcement, i.e. on the outer face of the ribs 24a and 24b, while thickness E is chosen such that after machining, compacting and shaping, the central portion 32 can form the rest of the flap, i.e. the reinforcement structure 20 and the part of the web extending between the outer edges of ribs 24a and 24b. The fibrous structure forming the profiled section 30 is made from fibers chosen according to the intended application, and are in this case preferably silicon carbide fibers. Other refractory fibers, such as alumina fibers could also be used. Various techniques may be employed to produce the profiled section 30. The latter can be formed by piling layers of a two-dimensional texture, such as a fabric cut out to the required dimensions. Preferably, to prevent risks of delamination, the layers are linked by needling or by implanting carbon yarns perpendicularly to the layers to form a three-dimensional structure. The implantation of yarns can be achieved as described in document FR-A-2 565 282. Alternatively, the profiled section 30 can also be produced by three-dimensional weaving.

The profiled section 30 is cut into lengths, from each of which is machined a blank for the flap 40, as shown in FIG. 3. Their length L is chosen to correspond, after compacting and shaping, to the maximum width of the web.

As shown in FIG. 3, the machining consists in forming the ribs 24a, 24b and 26 of the reinforcement structure 20 in the central portion 32 of the profiled section. The ribs 24a, 24b are formed with bevels 25a, 25b and 27a, 27b, and parts 28'a, 28'b intended to form the fingers 28a, 28b not curved towards the top. The sides 16a, 16b of the web 10 are also formed during the machining operation.

The thus-obtained blank is then shaped in a hot press to produce a preform whose shapes and dimensions are close to those of the flap shown in FIG. 4.

The shaping operation also includes forming the depression 12 in the web 10, forming the fingers 28, 28b by curving parts 28'a, 28'b, as well as compacting the fibrous structure.

Once the preform has been rigidified by means of the thermoformable resin, it is inserted in a tool for the matrix-forming phase. The matrix is preferably made of silicon carbide inserted within the fibrous structure by chemical vapor infiltration. The thermoformable resin is then eliminated during the rise in temperature preceding the infiltration of silicon carbide, the preform being held in shape by the tool in which it is placed. A chemical vapor infiltration of silicon carbide is described in document FR-A-2 401 888.

When the densification is finished, the flap undergoes an anti-oxidation treatment so as to enable it to withstand an oxidizing atmosphere at a high temperature. Such treatment is known in the art and can consist in depositing a glass layer and forming an external silicon carbide layer by chemical vapor deposition. In use, the glass internal layer provides a barrier against oxygen and serves to fill in micro-cracks.

What is claimed is:

1. A process for the manufacture of a composite component comprising a web and a reinforcement member, wherein said process comprises the steps of:
   providing a profiled section, said profiled section comprising a fibrous structure that is rigidified by impregnation with a thermoformable binder, said profiled section having a cross-section corresponding to the dimensions of a non-compacted blank of said composite component to be formed with said web and said reinforcement member in a single unit;

machining a blank of said composite component, said blank being produced from a length of said profiled section;

press forming said blank so as to obtain a preform having a shape and dimensions approximating those of said composite component being produced;

eliminating said thermoformable binder; and densifying said preform by chemical vapor infiltration of a material that is a constituent of a matrix within said fibrous structure.

2. The process as caimed in claim 1, wherein said profiled section is from a three-dimensional fibrous structure.

* * * * *

UNITED STATES PATENT AND TRADEMARK OFFICE
CERTIFICATE OF CORRECTION

PATENT NO. : 5,034,172
DATED : July 23, 1991
INVENTOR(S) : Michel Vives and Eric Pestourie It is certified that error appears in the above-identified patent and that said Letters Patent is hereby corrected as shown below:

Column 1, line 21, "which can he "H" " should read --which can be "H"--.

Column 1, line 44, "shown in Figure" should read --shown in Figure 1--.

Column 3, line 25, "web defines a depression" should read --web 10 defines a depression--.

Column 4, line 23, "FR-A-2 565 282" should read --FR-A-2 565 262--.

Column 4, line 42, "forming the fingers 28, 28b" should read --forming the fingers 28a, 28b--.

Signed and Sealed this

Thirtieth Day of March, 1993

Attest:

STEPHEN G. KUNIN

Attesting Officer     Acting Commissioner of Patents and Trademarks